United States Patent [19]

Jonda

[11] 4,038,885
[45] Aug. 2, 1977

[54] CONNECTING ELEMENT FOR A PART OF FIBER-REINFORCED PLASTIC

[75] Inventor: Wolfgang Jonda, Oberpframmern, Germany

[73] Assignee: Messerschmitt-Bolkow-Blohm GmbH, Munich, Germany

[21] Appl. No.: 633,712

[22] Filed: Nov. 20, 1975

[30] Foreign Application Priority Data

Nov. 26, 1974 Germany ............................ 2455810

[51] Int. Cl.² .............................................. G05G 1/00
[52] U.S. Cl. .................................. 74/581; 74/579 R;
64/12; 416/134 A
[58] Field of Search ................. 74/581, 579 R; 64/12;
416/134 A

[56] References Cited

U.S. PATENT DOCUMENTS

| 3,388,615 | 6/1968 | Ditlinger | 74/579R |
| 3,475,988 | 11/1969 | Ditlinger et al. | 74/579 R |
| 3,765,267 | 10/1973 | Bourquardez et al. | 74/581 |
| 3,782,220 | 1/1974 | Ditlinger | 74/581 |

*Primary Examiner*—Samuel Scott
*Assistant Examiner*—Randall Heald
*Attorney, Agent, or Firm*—Toren, McGeady and Stanger

[57] ABSTRACT

An arrangement for the reduction of stress in a connecting element having part of fiber-reinforced plastic. The fiber-reinforced plastic part is subject to being stressed by longitudinal and/or bending forces. A bush is retained by an appropriate retaining element. Disposed around the bush is a fiber-reinforced plastic part forming an end loop. An inner loop is formed within the outer loop with the outer curved boundary of the inner loop bearing on the bush. In a first embodiment, the inner loop is disposed completely within inner side walls of side portions of the end loop. In second and third embodiments, the inner loop penetrates the side portions of the end loop in a laminar or braided arrangement.

8 Claims, 6 Drawing Figures

CONNECTING ELEMENT FOR A PART OF FIBER-REINFORCED PLASTIC

FIELD OF THE INVENTION

The invention concerns a connecting element for a part of fiber-reinforced plastic stressed by longitudinal and/or bending forces when a fiber strand forms an end loop around a bush.

BACKGROUND OF THE INVENTION

Difficulty is frequently encountered in the introduction of longitudinal and bending forces into connecting fittings of highly stressed parts of fiber-reinforced plastic (FRP) because the resistance of FRP to alternating shearing stresses is only about one-twentieth of the resistance to alternating tensile stresses. It is therefore necessary to design the connecting regions of these parts so that the shearing stresses appearing in the FRP are reduced to a minimum.

Presently known arrangements are generally sufficient for the introduction of tensile forces. These arrangements provide embracing of an end loop of FRP by a shell of FRP or metal. For the introduction of compressive forces, this measure is not sufficient. The introduction of compressive forces over a wedge arranged inside an end loop of FRP, which is connected to a bush receiving a connecting bolt, is known. For very large reaction forces appearing in the connecting fittings, however, the transmission of shear between the wedge and the end loop is relatively too weak.

In order to improve the transmission of compressive forces, it is known to embrace the end loops additionally on all sides, for example, with metal fittings consisting of two parts. These fitting parts transmit the reaction forces produced by the bending forces to the front part of the FRP formed loop by way of compressive forces. This has the disadvantage, however, that harmful relative movements appear between the loop and the fittings, particularly under alternating stresses.

Another disadvantage in the use of metal fittings is that, due to the different coefficient of thermal expansion between the two materials, metal/plastic, either thermal stresses or a gap will appear at extremely high or low temperatures. This renders the transmission of the compressive forces difficult, so that the entire connecting fittings will be destroyed in the course of time, for example, under alternating bending stresses.

SUMMARY OF THE PRESENT INVENTION

It is therefore an object of the present invention to provide an improved connecting element for a part of fiber-reinforced plastic which can withstand stresses developed by longitudinal and/or bending forces to a greater degree than has been heretofore known.

It is an additional object of the present invention to provide an improved connecting element of fiber-reinforced plastic which can greatly withstand a highly stressed condition which avoids the use of special metal fittings.

It is a further object of the present invention to provide an arrangement for reduced stress in a connecting element having an end loop of fiber-reinforced plastic which is disposed around a bush which receives a retaining bolt.

It is an additional object of the present invention to provide an improved connecting element for a fiber-reinforced plastic part which can withstand great stresses and is simple and economical to construct.

In accordance with the present invention, a stress-reducing arrangement for a connecting element having a part of fiber-reinforced plastic subject to being stressed by longitudinal and/or bending forces, includes a bush, a retaining element for the bush and a first fiber strand of fiber reinforced plastic forming an end loop being disposed around the bush. The end loop includes side portions. Also included is a second fiber strand of fiber-reinforced plastic forming an inner loop being disposed within the end loop between the bush and the side portions of the end loop. The inner loop bears with its outer curved boundary on the bush.

The invention encompasses embodiments wherein the inner loop is arranged completely between the inner side walls of the side portions of the end loop and also embodiments where the fibers of the inner loop penetrate the inner side walls of the side portions of the end loop. Such penetration may either be by laminar portions transverse to the longitudinal direction of the end loop or may be by braiding or interweaving with the fibers of the end loop.

For a better understanding of the present invention, reference is made to the accompanying drawings and detailed description of various embodiments of the invention, while the scope of the invention will be pointed out in the amended claims.

DETAILED DESCRIPTION OF THE PRESENT INVENTION

For the production of connecting elements of fiber-reinforced plastic (FRP), bundles of fibers are used, e.g., carbon-, glass-, asbestos- or chemical fibers. Such fiber bundles are combined to a fiber strand and impregnated with a plastic compound. Typical plastic compounds used for this purpose include, e.g., epoxy, polyester, polyimid resin. These fiber strands are placed around a bush which can consist of metal, but may also be of FRP or plastic, to form a loop in a form corresponding to the connecting elements.

Figures 1, 2:
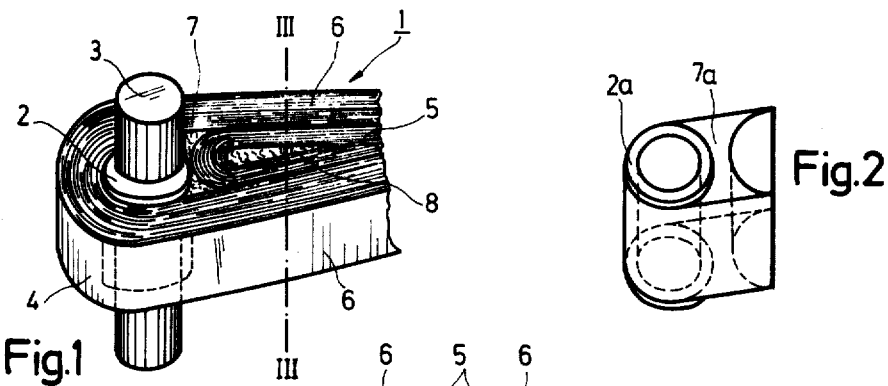
FIG. 1 shows, in perspective view, a connecting element with an inner loop arranged between the side portions of an end loop of fiber-reinforced plastic.
FIG. 2 is a partial perspective view of an embodiment of a bush to be inserted into the end loop of fiber-reinforced plastic.

Reference to FIG. 1 illustrates such connecting element 1. The connecting element 1 includes a portion which is disposed about a bush 2 in which is inserted a retaining bolt 3 serving to secure the parts equipped with the connecting element (not shown). The connecting element includes an end loop 4 which is placed around the bush 2. Inside the end loop 4, an inner loop 5 is arranged. The inner loop 5 is arranged between side portions 6 of end loop 4 and bears with its outer curved boundary on bush 2. In this embodiment, the forces transmitted by retaining bolt 3, bush 2 and inner loop 5 to end loop 4, are transmitted over the side portions 6 to end loop 4.

Figure 3:
FIG. 3 is a sectional view along the line III—III of FIG. 1.

The disposition of the inner loop 5 within the space between the bush and the side portions of the end loop creates recesses or cavities. These cavities formed between end loop 4 and bush 2 and the internal wedge cavity formed within the inner loop, can be filled by molded parts 7 and 8. These may consist, for example, of plastic with or without fiber insert. A cross-section of the embodiment of FIG. 1 is shown in FIG. 3. There it is seen that outer side portions 6 of end loop 4 sandwich the inner loop portions 5 with the molded part 8 centrally located within the inner loop 5.

Referring now to FIG. 2, it may be seen that the bush 2a may be constructed so as to be equipped with an extension portion 7a. Thus, such an extension portion will occupy the entire space between the end loop 4 and the inner loop 5 so that separate molded parts 7 may be eliminated.

Figure 4:
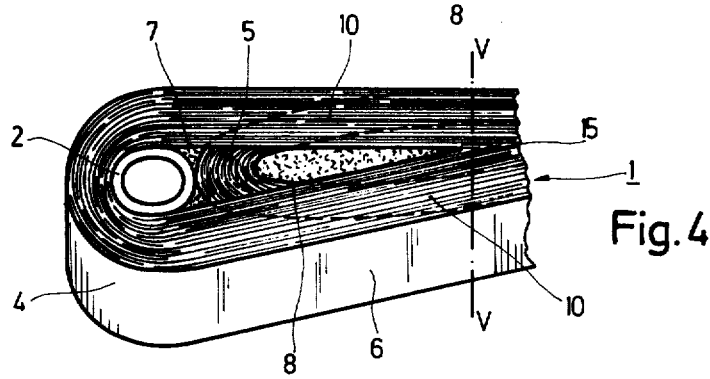
FIG. 4 illustrates, in perspective view, the connecting element with mutual penetration of the end and inner loops of fiber-reinforced plastic.
Figure 5A:
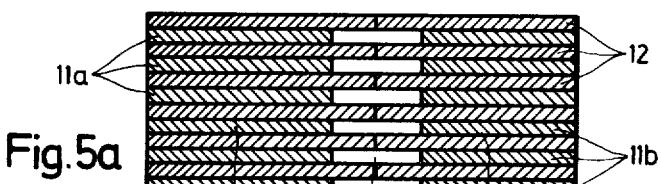
FIGS. 5a and 5b illustrate, in sectional view along the lines V—V of FIG. 4, two different embodiments of the present invention.

FIG. 4 illustrates an embodiment of the connecting element 1 where the sides 10 of the inner loop 5 penetrate the side portion 6 of end loop 4 with their fibers. In the embodiment of FIG. 5a, the sides 10 of inner loop 5, consist at least primarily of fiber laminates 11a and 11b, which penetrate corresponding fiber laminates 12 of the combined sides 6 of end loop 4. Thus, the interlocking of the two loops provides additional strength to the connecting element.

Figure 5B:
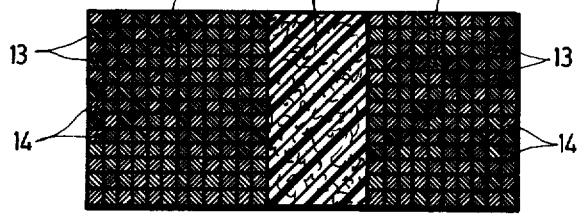

In the FIG. 5b embodiment, the fiber strands 13 of the sides 10 of inner loop 5, are braided or interwoven with corresponding fiber strands 14 of end loop 4. This arrangement also provides additional strength to the connecting element.

In the center part 15 of end loop 4 extend both the fiber laminates 12 according to FIG. 5a, and the fiber strands 14 according to FIG. 5b, without penetrating the fibers of the inner loop 5. Due to the mutual penetration of the fiber laminates 11 and 12 and of the thin fiber strands 13 and 14, as shown in FIG. 5a and 5b, respectively, the thrust surfaces for transmitting forces between inner loop 5 and end loop 4, are multiplied.

It has been shown that the problem of providing additional strength to connecting elements of fiber-reinforced plastic has been solved by providing an inner loop which bears with its outer curved boundary on a bush which is arranged inside an end loop of the fiber-reinforced plastic. This arrangement, which is simple to realize, has the advantage that the bush receiving a retaining bolt is imbedded between two loops of fiber strands, the loops jointly transmitting the introduced reaction forces directly to the part.

In the introduction of smaller reaction forces, it suffices that the inner loop, according to the invention, is mounted completely between the sides of the end loops. With greater reaction forces to be applied, the fibers of the inner loop penetrate those of the end loop in accordance with another feature of the invention. In both embodiments, according to the invention, the presently required metal fittings with their attendant disadvantages are eliminated. Due to the mutual penetration of the two loops, the thrust surface is increased by a multiple, and a connecting element is provided which shows no structural changes both at high bending stresses under tension and compression and at extreme temperatures.

In the embodiment wherein the inner loop penetrates the outer loop side portions, it has been shown that the fibers of the inner loop can either penetrate in layers transverse to the longitudinal direction of the loop, or the fibers may be interwoven or braided with those of the end loop. Whichever approach for penetrating the fibers is employed depends on the manufacturing facilities and the type of stress to which the connecting element will be exposed. Both types of mutual penetration of the two loops offer the assurance of high-strength connecting elements.

Connecting elements according to the present invention may be used in highly stressed situations such as in aviation and astronautics, for example, in the manufacture of blade roots for rotor blades. Such devices are exposed to great bending and centrifugal forces. They may also be used in connecting elements for parts, such as in astronautics, which are subject to extreme temperature fluctuations.

While different embodiments of the present invention have been described and shown, it is intended that all modifications and variations which come within the true spirit and scope of the present invention be encompassed.

What is claimed is:

1. A stress-reducing arrangement for a connecting element having a part of fiber-reinforced plastic subject to being stressed by longitudinal and/or bending forces, comprising:
   a bush;
   a retaining element for said bush;
   a first fiber strand of fiber-reinforced plastic, said fiber strand composed of a bundle of fibers, forming an end loop being disposed around said bush, said end loop having side portions; and
   a second fiber strand of fiber-reinforced plastic, said fiber strand composed of a bundle of fibers, forming an inner loop being disposed within said end loop between the bush and said side portions of said end loop, said inner loop bearing with its outer curved boundary on the bush.

2. The arrangement of claim 1 wherein the inner loop is arranged completely between the inner side walls of said side portions of said end loop.

3. The arrangement of claim 1 wherein the fibers of the inner loop penetrate the inner side walls of said side portions of said end loop.

4. The arrangement of claim 3 wherein the fibers of the inner loop penetrate the inner side walls of said side portions transverse to the longitudinal direction of the end loop.

5. The arrangement of claim 3 wherein the fibers of the inner loop are braided or interwoven with the fibers of the end loop.

6. The arrangement of claim 1 wherein said inner loop forms cavities between the outer curvature of the inner loop, the bush and the side portions of the end loop and wherein parts conforming to the shape of said cavities are disposed therein.

7. The arrangement of claim 1 wherein said inner loop includes an internal cavity and a part conforming to said internal cavity is disposed therein.

8. The arrangement of claim 1 wherein said bushing includes an extension portion which conforms with the outer curvature of said inner loop.

* * * * *